United States Patent [19]
Nishikawa et al.

[11] Patent Number: 4,750,379
[45] Date of Patent: Jun. 14, 1988

[54] TILT STEERING APPARATUS

[75] Inventors: Masumi Nishikawa, Toyoake; Masanobu Ishikawa, Nagoya, both of Japan

[73] Assignee: Aisin Seiki Kabushiki Kaisha, Aichi, Japan

[21] Appl. No.: 32,224

[22] Filed: Mar. 31, 1987

[30] Foreign Application Priority Data

Mar. 31, 1986 [JP] Japan ................... 61-73334

[51] Int. Cl.$^4$ ............................................. B62D 1/18
[52] U.S. Cl. ........................................ 74/493; 74/540; 280/775
[58] Field of Search .............. 74/493, 540; 280/775; 70/252

[56] References Cited

U.S. PATENT DOCUMENTS

| | | | |
|---|---|---|---|
| 4,463,626 | 8/1984 | Kazaoka ............................. | 74/493 |
| 4,502,730 | 3/1985 | Kazaoka et al. ..................... | 297/366 |
| 4,530,254 | 7/1985 | Toyoda et al. ....................... | 74/493 |
| 4,538,477 | 9/1985 | Kurusu et al. ....................... | 74/493 |
| 4,607,540 | 8/1986 | Kinoshita et al. .................... | 74/493 |

OTHER PUBLICATIONS

Ser. No. 07/016,798, "Tilt Steering Apparatus for Vehicles", filed Feb. 20, 1987.

Primary Examiner—Allan D. Herrmann
Attorney, Agent, or Firm—Finnegan, Henderson, Farabow, Garrett and Dunner

[57] ABSTRACT

A tilt steering apparatus for vehicles includes a fixed bracket and a rotational bracket rotatably mounted on the fixed bracket and having a ratchet fixed on a side thereof. A pawl, pivotally mounted on the fixed bracket, engages the ratchet when the rotational bracket is in an upward position and in a downward driving position. Memory means memorizes a selected engagement relationship between the pawl and ratchet when the pawl and ratchet are engaged and the rotational bracket is in a downward position. When the rotational bracket is subsequently being rotated to the downward position, intermediate means maintain the ratchet and pawl in a disengaged state until the rotational bracket is in the downward driving position.

6 Claims, 9 Drawing Sheets

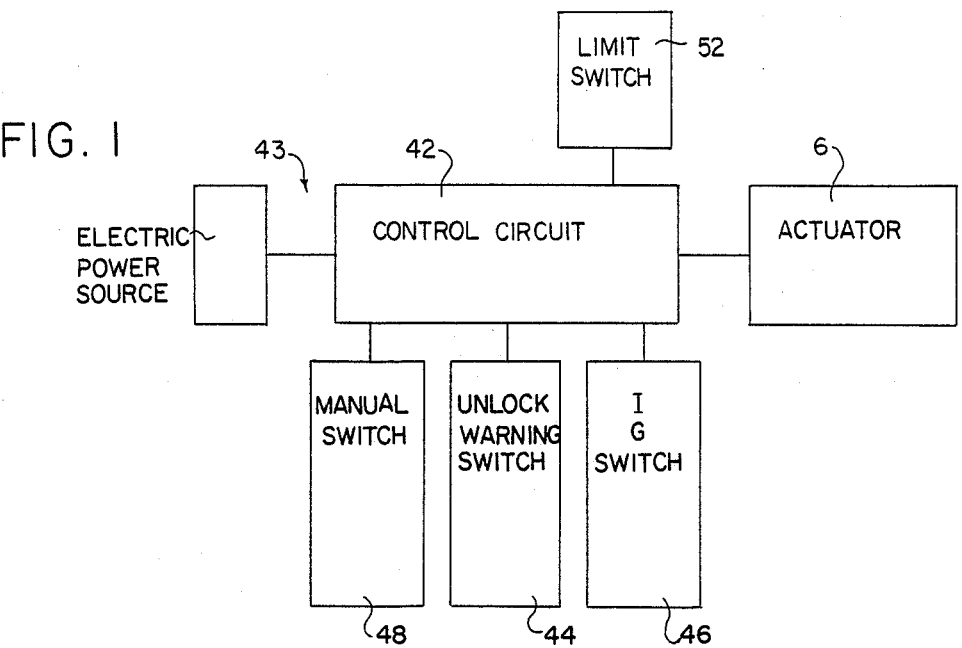
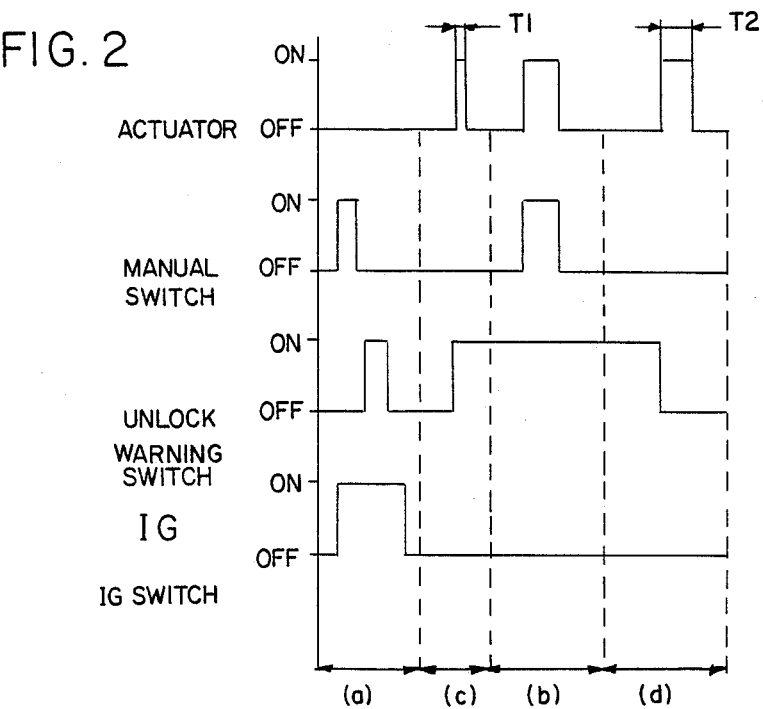

TILT STEERING APPARATUS

BACKGROUND OF THE INVENTION

1. Field of the Invention

The present invention relates to a tilt steering apparatus, and more particularly to a tilt steering wheel apparatus wherein the steering wheel is movable to one position for permitting a person to easily get in and out of a vehicle, and is returnable to a predetermined or memorized position for driving the vehicle.

2. Description of the Related Art

A tilt steering apparatus is generally assembled with a tilt and memory mechanism positioned between a bracket fixed to the vehicle and a rotational bracket. The rotational bracket supports a steering wheel and in turn is supported by a pin connected to the fixed bracket. The rotational bracket is upwardly biased by the force of a spring. When the tilt mechanism is actuated, the fixed relationship between the fixed and rotational brackets is released, moving the steering wheel to an upward away-position, so that a driver can easily get in and out of the vehicle. When the vehicle is ready to be driven, the brackets can be again fixed in relation to each other by moving the steering wheel downwardly to a memorized position.

In some conventional tilt steering apparatuses, when the steering wheel is adjusted to the upward position, the rotational bracket supporting the steering wheel is held only by the biasing force of a spring, so that the steering wheel is unsteady when it is gripped in an operator's hands. As a result, the steering wheel may be inadvertently returned to the memorized downward position by an unintended outer force, such as an operator's grasp. This unstable situation can be very dangerous.

Conventional tilt steering apparatuses are engaged and disengaged for tilting and are adjusted for driving angle with a link mechanism that requires two separate actuators, normally solenoids, for these various operations. Such dual actuators require more housing space than is readily available in a steering column. Dual actuators also have a larger power requirement than is desirable.

SUMMARY OF THE INVENTION

Accordingly, it is an object of the present invention to provide an improved tilt steering apparatus which overcomes the aforementioned disadvantages of the described conventional tilt steering apparatus.

A further object of the present invention is to provide an improved tilt steering apparatus which can be reliably tilted and locked.

A still further object of this invention is to provide an improved tilt steering apparatus which s relatively simple and includes a minimum number of parts.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the invention, as embodied and as broadly described herein, a tilt steering apparatus is provided. The tilt steering apparatus comprises a fixed bracket adapted to be attached to the vehicle, the fixed bracket having a mounting pin extending therefrom; a rotational bracket adapted to support the steering wheel, the rotational bracket being rotatably mounted on the fixed bracket, the rotational bracket rotatable between an upward position and a downward driving position, the rotational bracket having a ratchet fixed on a side thereof, the ratchet having a plurality of teeth; a pawl pivotally mounted on the fixed bracket, the pawl provided with teeth for engaging the ratchet teeth when the rotational bracket is in the upward position and in the downward position; a release lever rotatably mounted on the mounting pin for controlling engagement between the pawl and ratchet; actuating means operative when activated to rotate the release lever to a position for urging the pawl and ratchet out of engagement for releasing the rotational bracket from both the upward and downward positions, and operative when deactivated for rotating the release lever to another position for urging the pawl and ratchet into engagement for locking the rotational bracket in one of the upward and downward positions; means for selectively activating and deactivating the actuating means; memory means for memorizing a selected engagement relationship between the pawl teeth and ratchet teeth when the pawl and ratchet are engaged and the rotational bracket is in the downward position, the memory means being operative to return the pawl and ratchet to the selective engagement relationship in response to rotation of the rotational bracket to the downward position from the upward position; means for retaining the memorized selected engagement relationship of the pawl and ratchet when the rotational bracket is out of the downward position for limiting the steering wheel to the memorized downward driving position; and intermediate means for maintaining the ratchet and the pawl in a disengaged position after the release lever is rotated to the position for urging the pawl and ratchet into engagement, whereby the rotational bracket is rotatable to the memorized downward driving position.

The memory means retains the memorized pawl and ratchet relationship when the rotational bracket is not in the downward position by utilizing a retaining means, so that desired engaging and releasing between pawl and ratchet can be attained. An intermediate means influences pawl and ratchet engagement. The intermediate means includes a hook lever, a first intermediate lever having a pin which is engageable with a release lever and the hook lever, a second intermediate lever pivotably supported on a rotational bracket side and provided with a projection which engages a cover plate when the rotational bracket rotates upward and an engaging portion for pressing against an urging means which pulls the pin of the first intermediate lever into engagement with the hook lever.

In the present invention, when an actuator is activated so the steering wheel is moved to its upward position and the actuator is subsequently deactivated, the engaging state between the pawl and the ratchet is attained and the memory of the downward position is retained. When a key is inserted in the ignition key cylinder upon entering the vehicle, the engagement between the pawl and the ratchet is released, so that the steering wheel can be depressed downward to the memorized downward position.

The accompanying drawings, which are incorporated in and constitute a part of this specification, illustrate presently preferred embodiments of the invention, and, together with the description, serve to explain the principles of the invention.

BRIEF DESCRIPTION OF THE DRAWINGS

Various other features, objects and attendant advantages of the present invention will become self-evident when considered in connection with the accompanying drawings wherein:

FIG. 1 is a block diagram of a control system for a tilt steering apparatus according to the present invention;

FIG. 2 is a graphical illustration showing the state of the elements of FIG. 1 during operation of the present invention;

DETAILED DESCRIPTION OF THE PREFERRED EMBODIMENT

Figure 3:
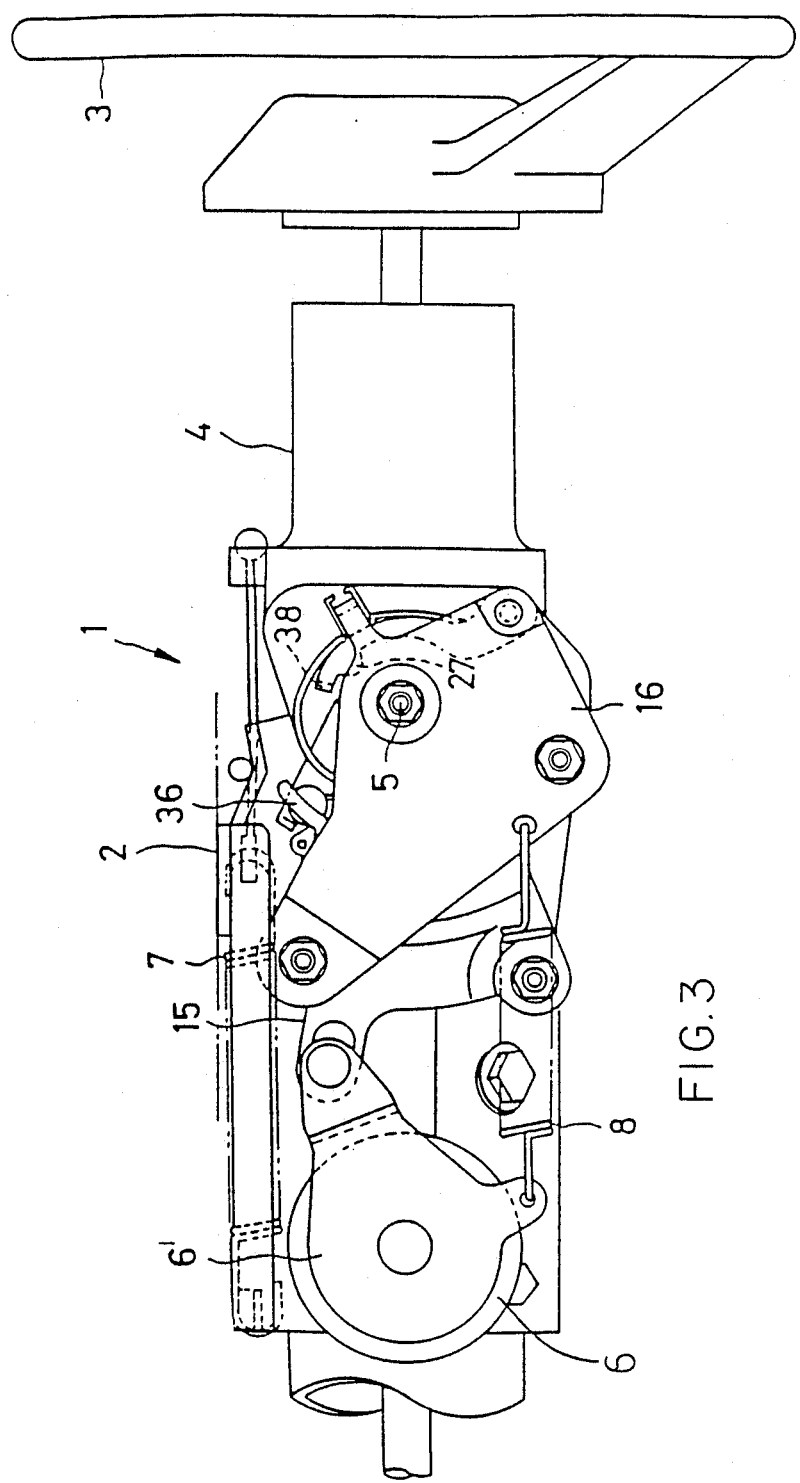
FIG. 3 is a side view of a tilt steering apparatus according to the present preferred embodiment of the invention.

Reference will now be made in detail to a presently preferred embodiment of the invention, an example of which is illustrated in the accompanying drawings. Throughout the drawings, like reference characters are used to designate like elements.

Referring to FIG. 3, a tilt steering apparatus 1 includes a fixed bracket 2 adapted to be fastened to a vehicle body, and a rotational bracket 4, rotatably supported on fixed bracket 2 for supporting a steering wheel 3. Brackets 2 and 4 are rotatable with respect to each other through a first pin 5 and a second pin 5' (see FIG. 10). An apparatus for keeping a fixed relationship between brackets 2 and 4, and for attaining tiltable movement therebetween is assembled around first pin 5 and is actuated by a rotational type actuator 6, preferably a solenoid. A first spring 7 biases rotational bracket 4 in a counterclockwise direction around pins 5, 5' to an upward position, as viewed in FIG. 3; and a second spring 8 biases an output portion 6' (see FIG. 10) of actuator 6 toward the position shown in FIG. 3, namely, to an OFF position in which bracket 2 and 4 are in a fixed relationship.

Referring to the block diagram of FIG. 1, actuator 6 is controlled by a control system 43. Control system 43 includes an unlock warning switch 44 that turns ON upon insertion of the ignition key, and turns OFF when the ignition key is removed, for detecting whether a key is inserted into a key cylinder of the ignition, an ignition switch (IG) 46 that actuates the electrical system of the auto engine, a manual switch 48 that operates to actuate the control system, which includes circuitry normally of the open type, and limit switch 52 that turns ON when rotational bracket 4 is in the upward position. Switches 44, 46 and 48 operatively cooperate with a control circuit 42 to control actuator 6. The elements of control circuit 42 are shown in the circuit diagram of FIG. 11.

Figure 11:
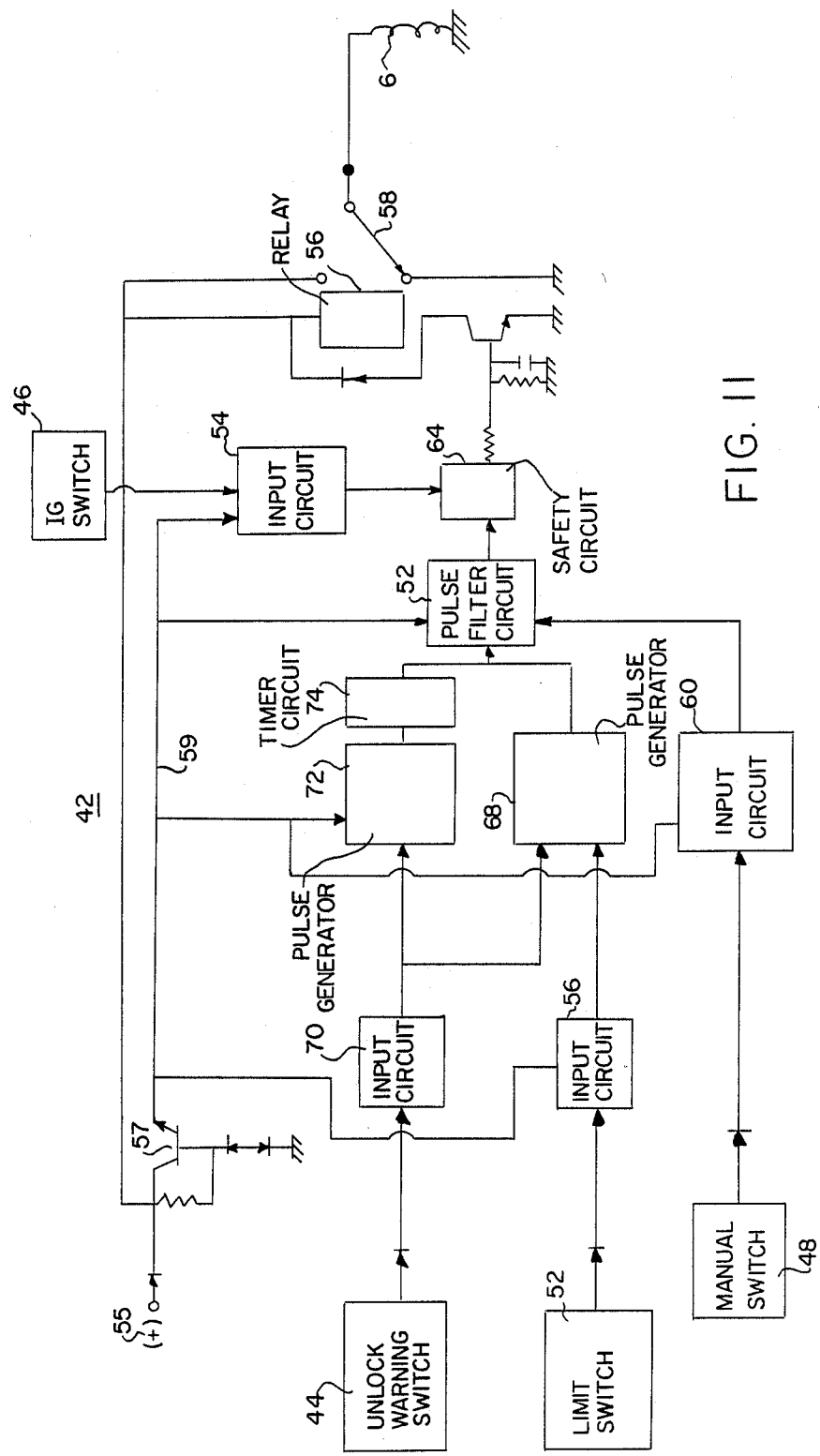
FIG. 11 is a schematic circuit diagram showing the control circuit of FIG. 1.

When ignition switch 46 is turned on input circuit 54 is activated, which deenergizes relay 56 to switch contact 58 to the position shown in FIG. 11, thereby deenergizing actuator 6 so as to lock rotational bracket 4 in the driving position. Input circuit 54 may include a connecting NAND gate to prevent completion of a circuit from "plus" supply 55, transistor 57 and conductor 59 for activating actuator 6, when ignition switch 46 energizes circuit 54. With switch 46 in the "OFF" position, manual switch 48 can turn on actuator 6 through input circuit 60, pulse filter 62, safety circuit 64, and relay 56 to permit ajustment of the driving position. Limit switch 52 is operated when the bracket 4 reaches the limit of its upward position and deactivates actuator 6 through input circuit 66, pulse generator 68, filter 62, circuit 64 and relay 56. Unlock warning 44 permits the actuator 6 to be actuated momentarily through input circuit 70, pulse generator 72, timer circuit 74, circuits 62, 64, and relay 56. After a short time period, timer circuit 74 runs out and actuator 6 is deactivated.

Control system 43 operates to control actuator 6 as graphically shown in FIG. 2. When the ignition switch 46 is ON, as when the vehicle is being operated, the actuator 6 cannot be operated to unlock steering wheel 3 regardless of the ON-OFF positions of unlock warning switch 44 and manual switch 48. When the engine is stopped and IG switch 46 if OFF, actuator 6 is actuated to an ON position for adjusting the angle between brackets 2 and 4 when the manual switch is turned ON as shown in graph portion (b). In addition, actuator 6 turns on for a short predetermined time $T_1$ upon insertion of the ignition key, as is done when getting in the vehicle, as shown in graph portion (c), to unlock steering wheel 3 for downward rotation. Actuator 6 also turns on for another short predetermined time $T_2$ upon removal of the ignition key, as is done when getting out of a vehicle, as shown in graph portion (d), to unlock steering wheel 3 for upward rotation.

Figure 10:
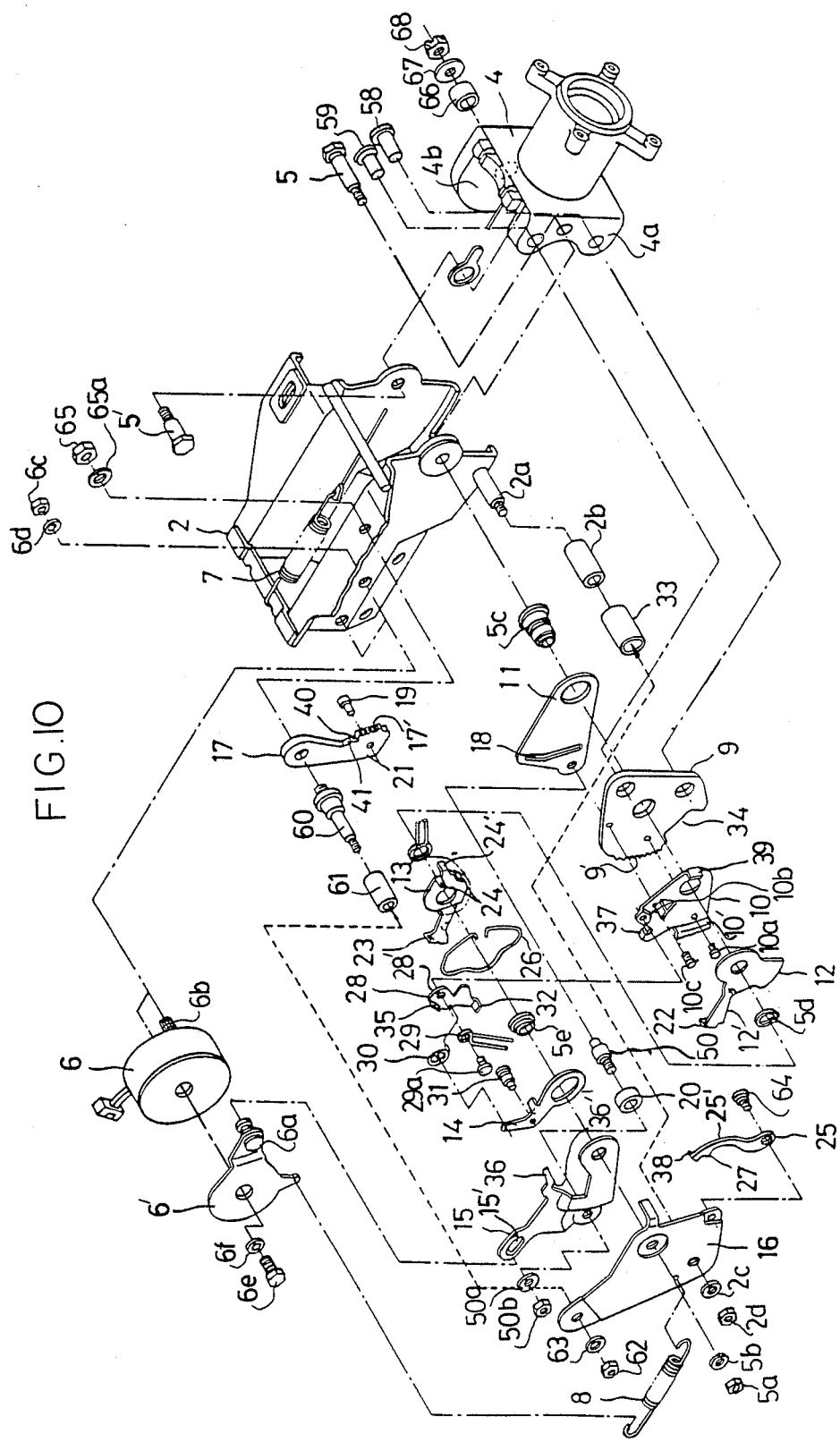
FIG. 10 is an exploded perspective view illustrating the relationship of the embodied elements of a preferred embodiment of the present invention.

In FIGS. 3–10, the elements of tilt steering apparatus 1 are shown. As shown in FIG. 10, a sub-plate 10 is mounted with pins 10a and 10c on an outer side of a ratchet 9 which is fixedly connected to rotational bracket 4. An extension 10b is provided on subplate 10 for engaging an extension 36 of release lever 15'. A lower lever 11, a hook lever 12, a memory lever 13, a first intermediate member 14 and a release lever 15 are rotatably supported on pin 5 which also passes through ratchet 9 and sub-plate 10. Collars 5c and 5e surround the pin 5 and a spring 5d is positioned around the collar 5c between hook lever 12 and memory lever 13. The ends of pin 5 are supported by a cover plate 16 and fixed bracket 2. A nut 5a and washer 5b are provided on the end of pin 5 to fix the plate 16 to the bracket 2. A pawl 17 is pivotably supported by a pin 60 between cover plate 16 and fixed bracket 2. Nut 62 and washer 63 are provided on one end of pin 60 to secure cover late 16 on the pin 60. Nut 64 and washer 65 are provided on the other end of pin 60 to secure fixed bracket 2 on the pin 60. Collar 61 is also provided on pin 60 between pawl 17 and cover plate 16. Pawl 17 is provided with teeth 17' for engaging with teeth 9' on ratchet 9 and a pin 19 for inserting into an elongated hole 18 of lower lever 11. Engaging pawl 17 and ratchet 9 lock rotational bracket 4 and steering wheel 3 in a fixed position. Pins 58 and 59 fix ratchet 9 to rotational bracket 4. Lower lever 11 is pivotably supported on the release lever 15 by a pin 50 and a collar 20. Collar 20 contacts with a cam surface 21 of pawl 17 and in cooperation with pin 19, in elongated hole 18, controls engagement between pawl 17 and ratchet 9. As will be described more fully below, a projection 22 on hook lever 12 sometimes engages step portion 40 on pawl 17 to maintain the teeth 17' on pawl 17 in a disengaged position from the teeth 9' on ratchet 9.

Memory lever 13 is rotatably supported on pin 5 through an elongated hole 13', and has a projection 23 for engaging with teeth 10' on sub-plate 10. Memory lever 13 is also provided with projecting pieces 24, 24'. Projecting pieces 24 contact with an outer surface 25' of a cam lever 25 that is pivotably supported by a pin 64 on the cover plate 16 at one end thereof. A spring 26 engages projecting pieces 24, 24' to urge memory lever 13 leftwardly, as viewed in FIG. 4, against cam lever 25, so that projection 23 of memory lever 13 and the teeth 10' of sub-plate 10 are not engaged. A cam surface 27 of cam lever 25 is contacted by release lever 15 that is connected to output portion 6' of the actuator 6 through an elongated hole 15' by a pin 6a. The actuator 6 is attached to the fixed bracket 2 by a threaded extension 6b and is secured with a nut 6c and washer 6d. Related U.S. patent application Ser. No. 16,798 entitled Tilt Steering Apparatus For Vehicles, filed on Feb. 20, 1987 and assigned to a common assignee, and U.S. Pat. No. 4,502,730, entitled Fixed-Angle Adjusting Mechanism that issued on Mar. 5, 1985, disclose similar memory levers and are hereby incorporated by reference.

A second intermediate member 28 is pivotably supported on the sub-plate 10 by pin 29a and has a first torsion spring 29 mounted thereon. First and second intermediate members 14, 28 are connected by second torsion spring 30. A pin 31 on a side of first intermediate member 14 and a projection 32 on the second intermediate member 28 each extend between the legs of the torsion spring 29.

A stopper 33 mounted on an extension pin 2a of the fixed bracket 2 is engageable with a groove 34 of ratchet 9, so that the rotational angle of the rotational bracket 4 is limited. Stopper 33 may be constructed such that an elastic material 2b is disposed within stopper 33 to serve a damping function. The extension pin 2a also extends through the cover plate 16. A washer 2c and nut 2d are provided at the end of the extension pin 2a to secure the cover plate 16 on the extension pin 2a.

Figure 7:
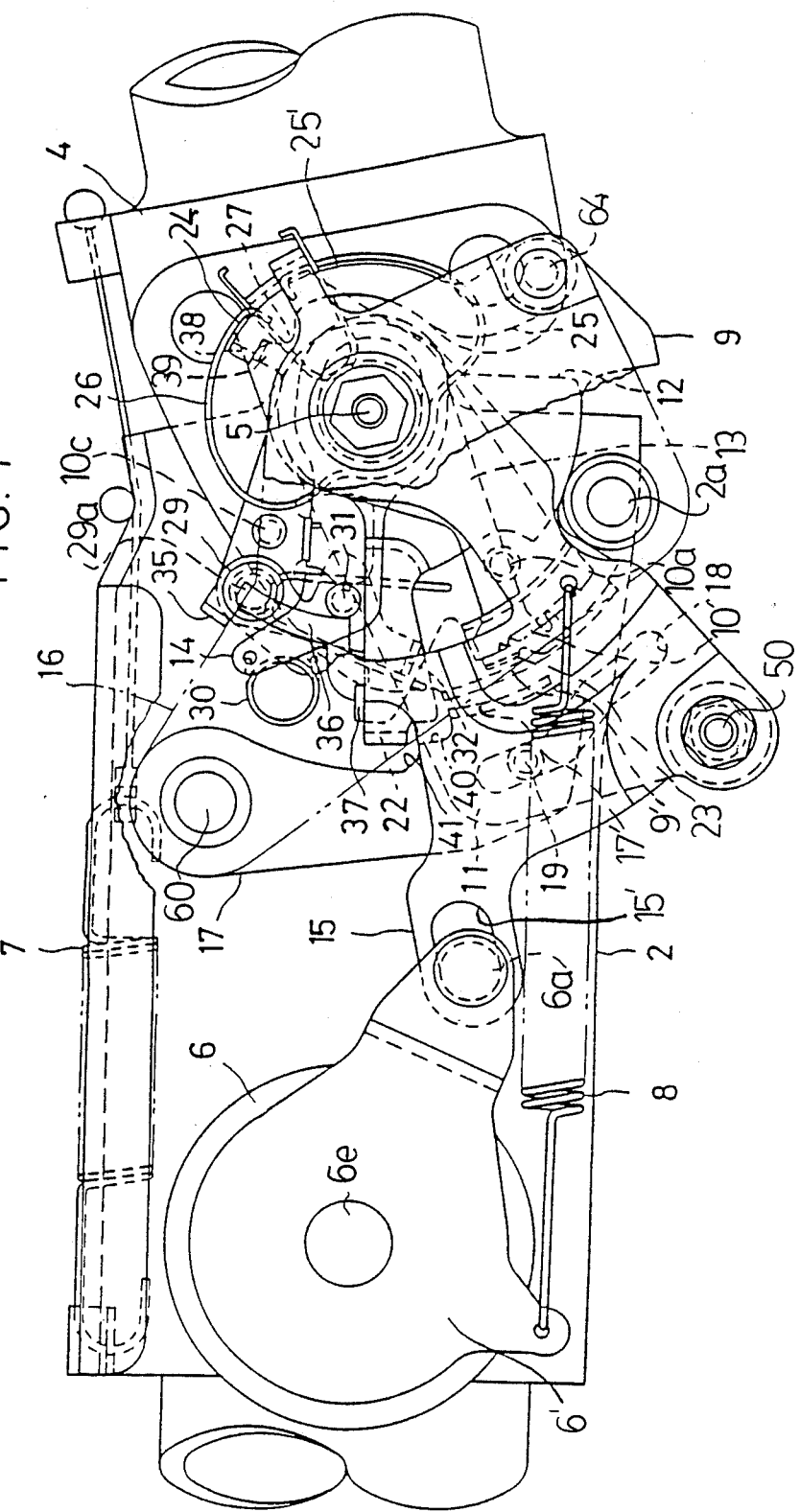
FIG. 7 is an enlarged view of FIG. 3 illustrating the position of the apparatus when the actuator is in the ON-state and the wheel is tilted to its upward away position.

When actuator 6 is actuated upon removing a key from the ignition, output portion 6' of the actuator 6 is rotated in a clockwise direction as shown in FIG. 7 and release lever 15 is rotated around pin 5 in a counterclockwise direction. The output portion 6' is rotatably fixed to the actuator 6 by a pin 6e and washer 6f. As a result, lower bracket 11 is similarly rotated in a counterclockwise direction by release lever 15 through pin 50 (see FIG. 10).

A spacer 20 is provided on the pin 50 between lower bracket 11 and the release lever 15. A washer 50a and nut 50b are provided on the end of the pin to secure the cover plate 16 on the pin 50. As lower bracket 11 rotates, pin 19 is moved along elongated hole 18 to rotate pawl 17 in a clockwise direction, so that engagement between pawl 17 and ratchet 9 is released. When pawl 17 is disengaged from ratchet 9, spring 7 rotates bracket 4 upward in a counterclockwise direction around pins 5, 5' from the downward position shown in FIG. 4 to the upward position shown in FIG. 7.

Pins 5 and 5' travel through side walls 4a and 4b of rotational bracket 4, respectively. Collar 66, washer 67 and nut 68 are provided on the end of pin 5' to pivotally fix the rotational bracket 4 to the fixed bracket 2. A lever 57 is positioned on pin 5' between fixed bracket 2 and side wall 4b. Ratchet 9 and sub-plate 10 rotate with bracket 4.

Figure 4:
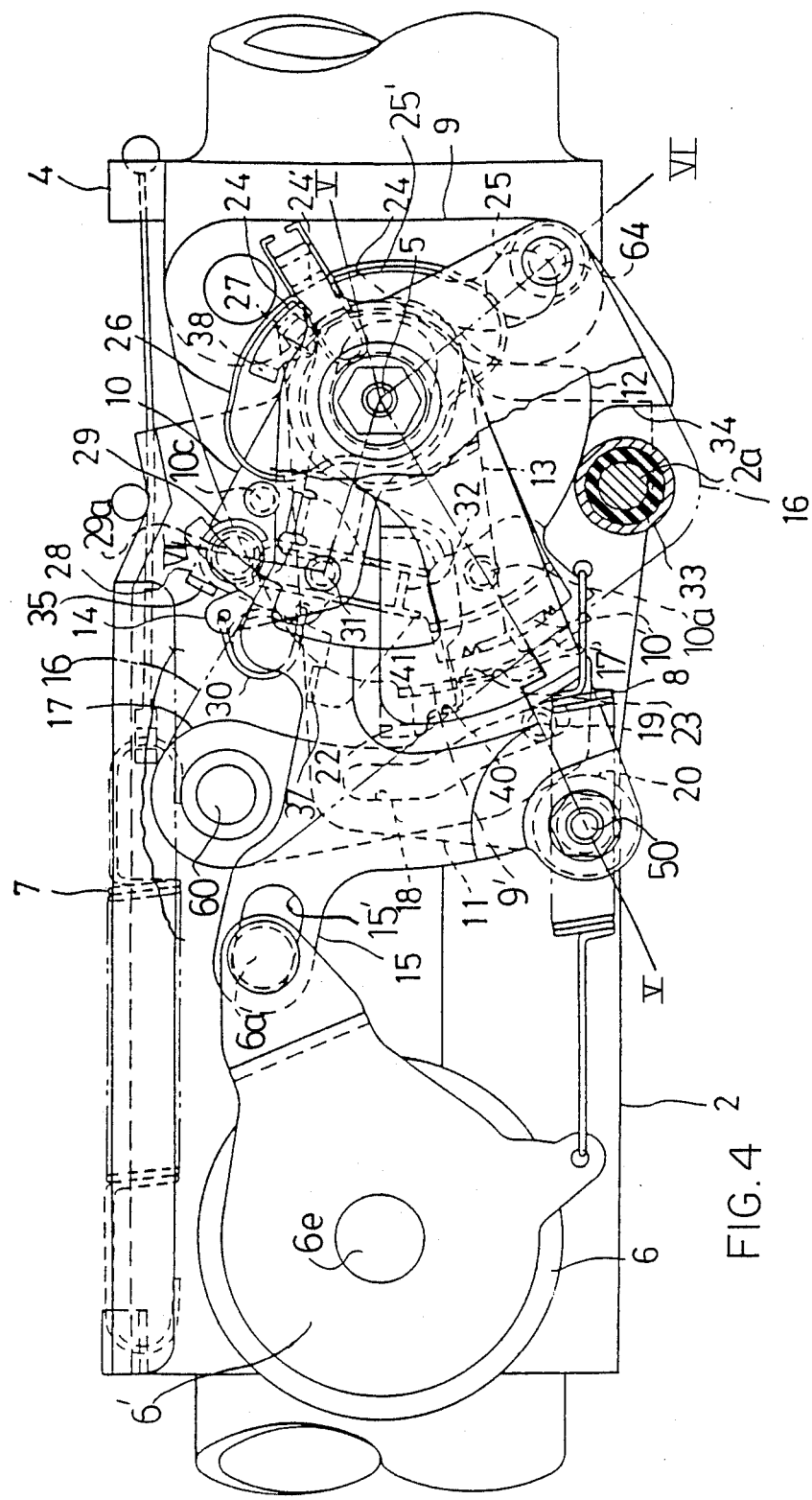
FIG. 4 is an enlarged view of FIG. 3 illustrating the position of the apparatus when the actuator is in an OFF-state and the wheel is in the downward neutral position.
Figure 5:
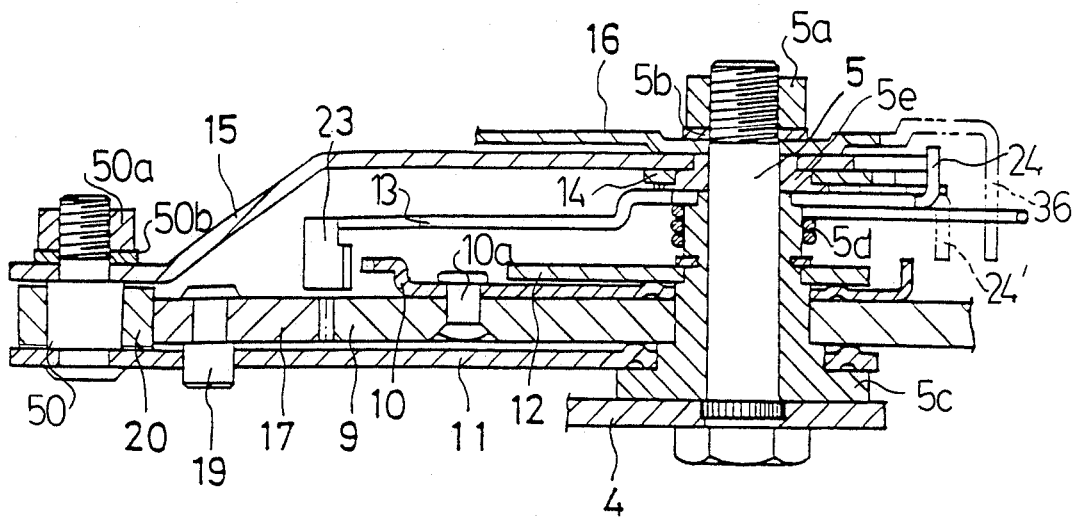
FIG. 5 is a sectional view taken along line V—V of FIG. 4.
Figure 6:
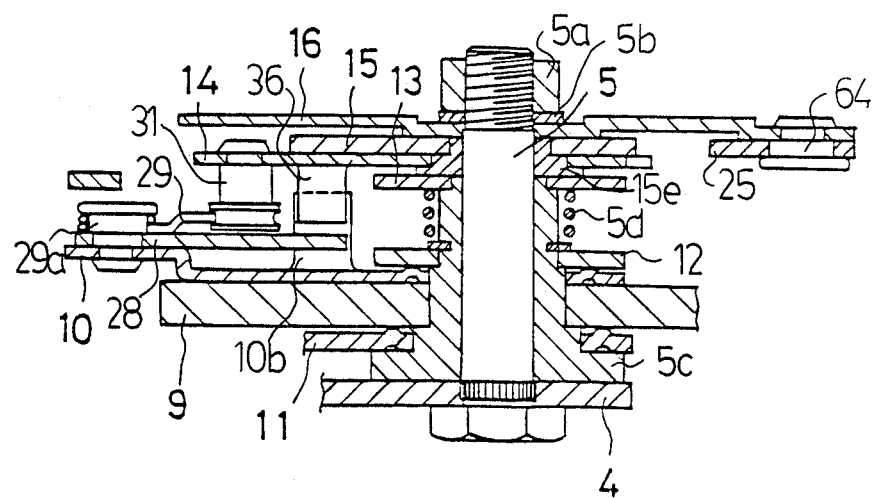
FIG. 6 is a sectional view taken along the line VI—VI of FIG. 4.

When sub-plate 10 rotates, an engaging piece 37 on sub-plate 10 moves from the position shown in FIG. 4 to the position shown in FIG. 7. Hook lever 12 is held down in the position shown in FIG. 7 by engaging piece 37. In this position, projection 22 on hook lever 22 will engage step portion 40 on pawl 17 when pawl 17 moved toward ratchet 9 upon deactivation of actuator 6. Thus, the teeth 17' on pawl 17 can be kept disengaged from the teeth 9' on ratchet 9 after actuator 6 is deactivated.

Upon rotation of sub-plate 10 to the position shown in FIG. 7, a projection 35 on second intermediate lever 28 contacts with cover plate 16 and is rotated in a clockwise direction about a pivot 28' (see FIG. 10) at which second intermediate lever 28 is rotatably connected to plate 10. Upon such rotation, projection 32 on second intermediate lever 28 presses against one leg of torsion spring 29, so that pin 31 of first intermediate lever 14 is leftwardly urged, as viewed in FIG. 7, by the other leg of torsion spring 29. When pin 31 on first intermediate lever 14 is moved leftward to its full extent, pin 31 will be in a position to hold hook lever 12 in a position for engaging step portion 40 of pawl 17 as will be described below. However, leftward movement of the pin 31 is limited at this time by an engaging portion 36 of release lever 15 so hook lever 12 will not engage pawl 17 and the rotational bracket will not be prevented from locking in the upward position.

Rotation of release lever 15 also makes cam lever 25 rotate in a clockwise direction when cam surface 27 is pressed by rotating release lever 15. Rotation of lever 25 urges projecting piece 24 of memory lever 13 rightwardly against the biasing force of spring 26, as viewed in FIG. 7. When memory lever 13 moves rightwardly, projection 23 on memory lever 13 engages with teeth 10' of sub-plate 10 and memory lever 13 is thus locked in rotational engagement with sub-plate 10. When projection 23 and teeth 10' engage, the position of memory lever 13 with respect to sub-plate 10 before rotational bracket 4 rotates to the upward position becomes fixed.

Figure 8:
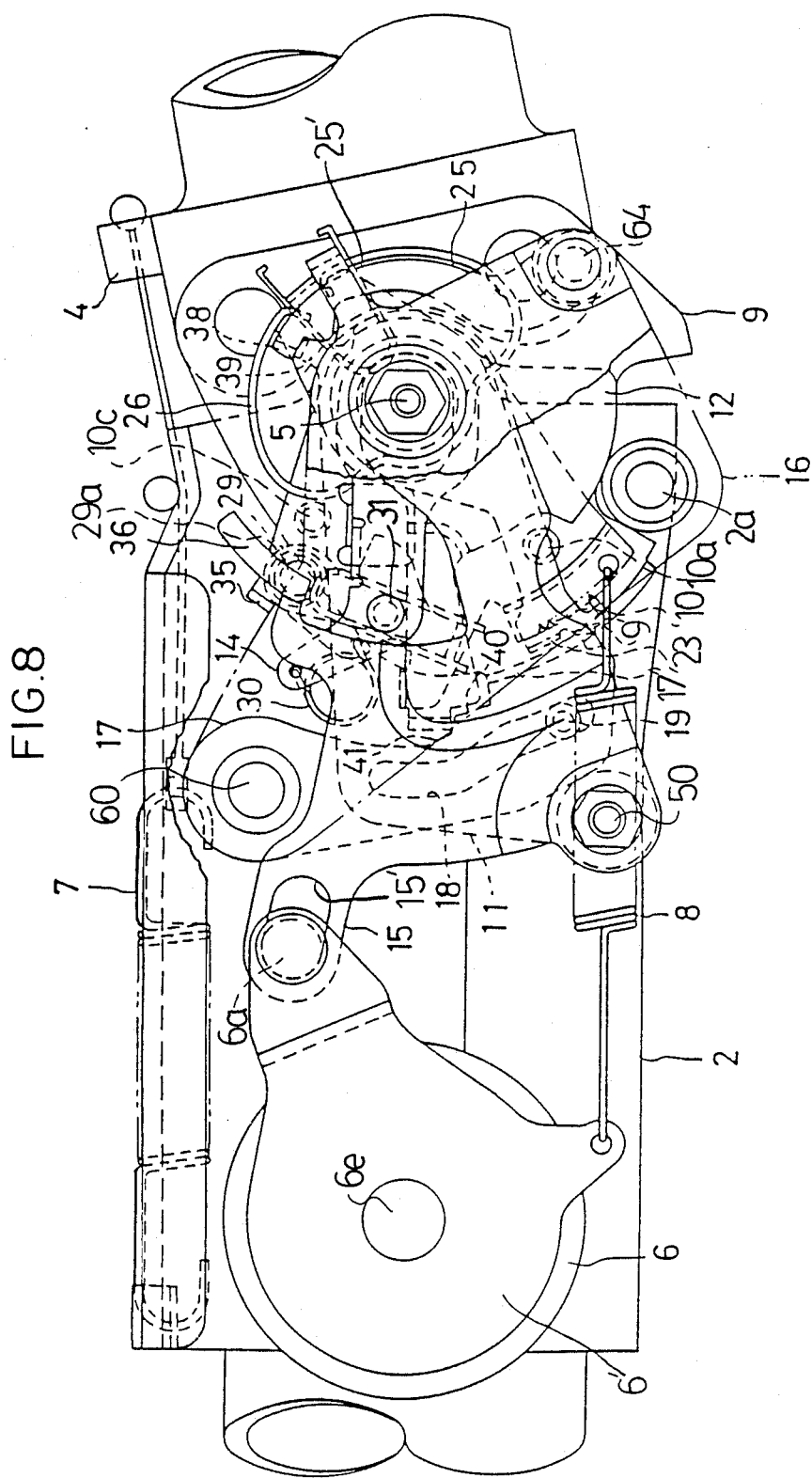
FIG. 8 is a view similar to FIG. 7 illustrating the apparatus in the upward state with the actuator in the OFF-state.
Figure 9:
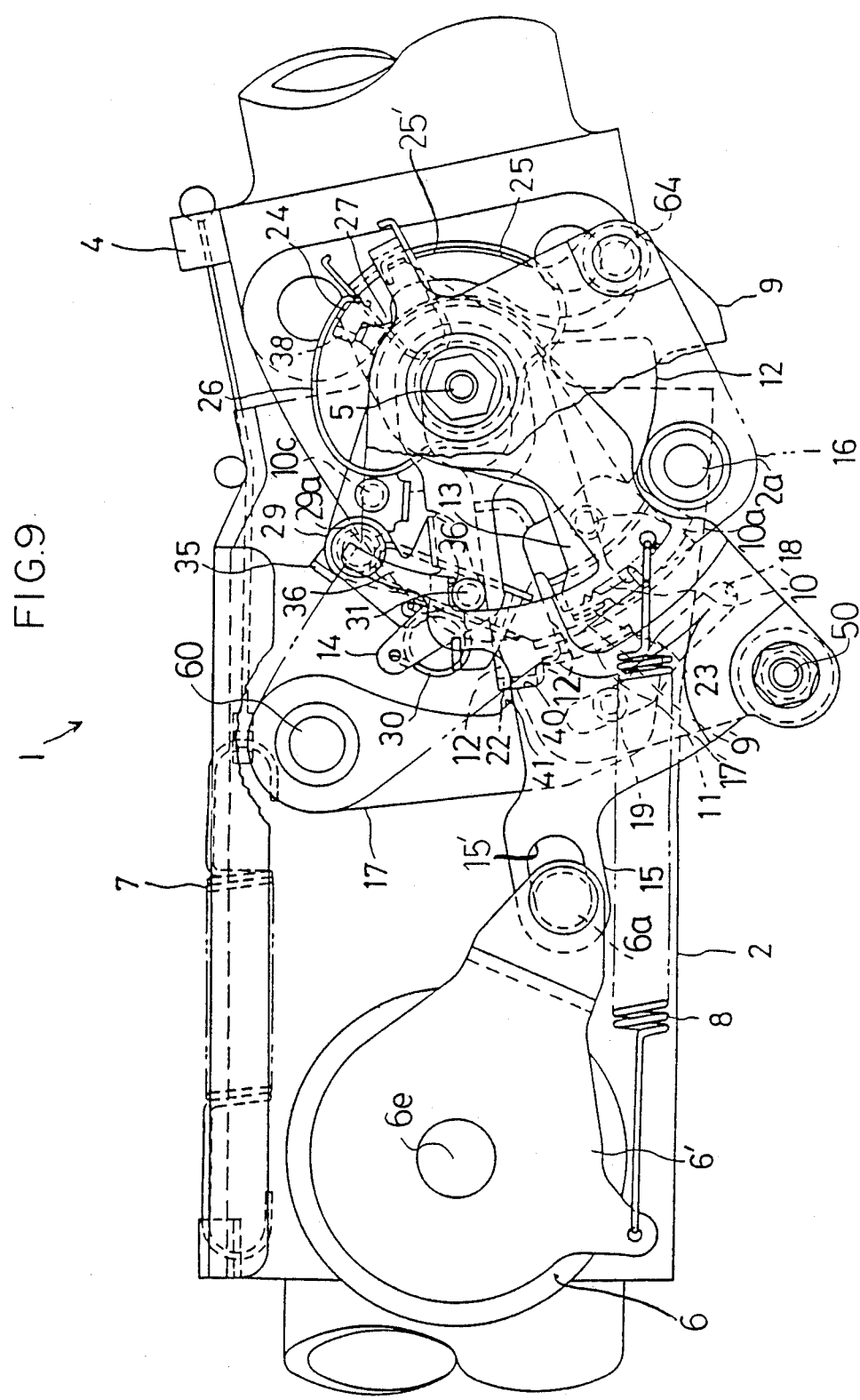
FIG. 9 shows the view of FIG. 3, when the steering wheel is being pressed downward and actuator is in the ON-state.

When horizontal bracket 4 rotates to the upward position, and after a certain time is passed, or alternatively when the upward position is detected by a limit switch 52 that detects when bracket 4 and steering wheel 3 have reached the upward position, actuator 6 is deactivated and spring 8 returns release lever 15 to the position shown in FIG. 4. Accordingly, the relationship between brackets 2 and 4 becomes fixed due to engagement between ratchet 9 and pawl 17, and unsteady movement of the rotational bracket 4 is prevented as shown in FIG. 8. Lower lever 11 rotates clockwise when release lever 15 returns to the original position and pin 19 is moved with the guidance of the elongated hole 18, so that the teeth 17' of pawl 17 and the teeth 9' of ratchet 9 are again engaged and bracket 4 is locked in the upward position as shown in FIG. 8.

In the position shown in FIG. 8 engaging portion 38 of cam lever 25 and engaging portion 39 of sub-plate 10 are engaged because sub-plate 10 was rotated counterclockwise when bracket 4 rotated to the upward position and engaging portion 39 is rotated to a position for engaging engaging portion 38. Engagement between engaging portions 38 and 39 holds cam lever 25 in the rotated position of FIG. 7 against the biasing force of spring 26 even after release lever 15 returns to its original position. Thus, memory lever 13 continues to be urged rightwardly, as viewed in FIG. 8 and memory lever 13 and sub-plate 10 remain engaged so that the memorized initial relationship between memory lever 13 and sub-plate 10 is retained.

When release lever 15 returns to the original position, engaging portion 36 on lever 15 moves clockwise, as viewed in FIG. 8 to release pin 31 on first intermediate lever 14. Upon release of pin 31, first intermediate lever 14 is leftwardly moved, as viewed in FIG. 8, by the torsion spring 29. In this position, pine 31 will hold hook lever 12 in engagement with step portion 40 of pawl 17 so as to keep pawl 17 and ratchet 9 from re-engaging the next time pawl 17 and ratchet 9 are disengaged.

When a drive returns to the vehicle and inserts the ignition key, the actuator is again activated as graphically shown portion (d) of FIG. 2. When the actuator 6 is activated, output portion 6' moves to the position shown in FIG. 9. Engagement between pawl 17 and the ratchet 9 is released in the manner described in connection with FIG. 7 and bracket 4 is free to be rotated toward the downward position. Upon such release, projection 22 of hook lever 12 is inserted into step portion 40 positioned close to a circular-arc surface 41 of pawl 17. Projection 22 is held in step portion 40 by pin 31 which is held in position by a lower edge portion 36' on engaging portion 36 of release lever 15. Thus, the disengaged state between pawl 17 and ratchet 9 will be maintained even if the actuator 6 is deactivated and output portion 6' is urged by spring 8 toward the position shown in FIG. 4. After a short predetermined period of time actuator 6 is deactivated, and hook lever 22 keeps pawl 17 and ratchet 9 from engaging. Thus, bracket 4 can still be rotated.

When pawl 17 and ratchet 9 are disengaged, rotational bracket 4 is held in the upward position by spring 7. When a driver pushes down on steering wheel 3, rotational bracket 4 and sub-plate 10 rotate in a clockwise direction. Memory lever 13 rotates with sub-plate 10 because projection 23 is engaged with teeth 10' on sub-plate 10. With this rotation, projection 23 of memory lever 13 contacts with a side edge 12' of hook lever 12 and hook lever 12 is upwardly pressed off of step portion 40 of pawl 17, so that pawl 17 and ratchet 9 are forced into engagement by the return biasing force of spring 8 exerted on pawl 17 by way of release lever 15, pin 50, lower lever 11 and pin 19. Cam lever 25 is simultaneously rotated in a counterclockwise direction to the position shown in FIG. 4 by the returning movement of the release lever 15 and memory lever 13 is permitted to be pulled leftwardly as viewed in FIG. 9, by spring 26 to a position disengaged from teeth 10' of sub-plate 10. Thus, rotational bracket 4 is again fixed in the initial locked position of FIG. 4.

In the conventional tilt steering apparatus described above, greater space is required in order to accomplish both engaging and disengaging of the steering wheel, and adjusting of the driving position. In order to have the ability to lock and unlock the wheel in both the upward tilted position and the downward operating position, two solenoids are needed, one for release from each position. In the present invention, the addition of intermediate means 14, 28, 12 and an engaging portion 39 on sub-plate 10 for engaging cam lever 25 overcomes this problem, while requiring only one solenoid. Thus, the present invention allows for locking in both positions with equivalent strength or force, while using less space and consuming less power.

By the foregoing, there has been disclosed a preferred form of a tilt steering apparatus constructed in accordance with the present invention. It will be appreciated that various additions, substitutions, modifications and omissions may be made thereto without departing from the spirit of the invention. Thus, it is intended that all matter contained in the foregoing description or shown in the accompanying drawings shall be interpreted as illustrative and not in a limiting sense.

What is claimed is:

1. A tilt steering apparatus for a vehicle steering wheel comprising:
    a fixed bracket adapted to be attached to the vehicle, said fixed bracket having a mounting pin extending therefrom;
    a rotational bracket adapted to support the steering wheel, said rotational bracket being rotatably mounted on said fixed bracket, said rotational bracket rotatable between an upward position and a downward driving position, said rotational bracket having a ratchet fixed on a side thereof, said ratchet having a plurality of teeth;
    a pawl pivotally mounted on said fixed bracket, said pawl provided with teeth for engaging said ratchet teeth when said rotational bracket is in said upward position and in said downward position;
    a release lever rotatably mounted on said mounting pin for controlling engagement between said pawl and ratchet;
    actuating means operative when activated to rotate said release lever to a position for urging said pawl and ratchet out of engagement for releasing the rotational bracket from both the upward and downward positions, and operative when deactivated for rotating said release lever to another position for urging the pawl and ratchet into engagement for locking the rotational bracket in one of the upward and downward positions;
    means for selectively activating and deactivating the actuating means;
    memory means for memorizing a selected engagement relationship between said pawl teeth and ratchet teeth when said pawl and ratchet are engaged and said rotational bracket is in the downward position, said memory means being operative to return said pawl and ratchet to the selected engagement relationship in response to rotation of said rotational bracket to the downward position from said upward position;
    means for retaining the memorized selected engagement relationship of said pawl and ratchet when said rotational bracket is out of the downward position for limiting the steering wheel to the memorized downward driving position; and
    intermediate means for maintaining said ratchet and said pawl in a disengaged position after said release lever is rotated to said position for urging the pawl and ratchet into engagement, whereby said rotational bracket is rotatable to the memorized downward driving position.

2. The tilt steering apparatus according to claim 1 wherein said intermediate means includes a first intermediate member rotatably mounted on said mounting pin and having a first pin, a second intermediate member pivotally supported on said rotational bracket and having an engaging member, a hook member rotatably mounted on said mounting pin to abut the ratchet for preventing the ratchet from engaging the pawl, and urging means between said first and second intermediate members for urging said first pin against said hook member in a direction causing said hook member to abut the ratchet.

3. The tilt steering apparatus according to claim 2 wherein said urging means is a torsion spring.

4. The tilt steering apparatus according to claim 3 wherein said engaging member of said second intermedaite member includes a projection for engaging a cover plate over the tilt steering apparatus when the rotational bracket is rotated to the upward position, said projection rotating the engaging member on the second intermediate member against the torsion spring for urging the first pin of the first intermediate member against the hook lever.

5. The tilt steering apparatus according to claim 2 wherein said memory means includes a sub-plate fixed to said rotatable bracket, said sub-plate having a plurality of teeth, and a memory lever rotatably supported on said mounting pin, said memory lever having a projection for engaging said sub-plate teeth when said actuator is activated, said memory lever engaging said sub-plate at a memory angle in accordance with the selected engagement relationship between the ratchet and pawl.

6. The tilt steering apparatus according to claim 5 wherein said retaining means includes means for retaining the sub-plate teeth and the memory lever projection in engagement at the memory angle when said rotational bracket is out of the downward position.

* * * * *